(12) United States Patent
Josse (10) Patent No.: US 6,259,925 B1
(45) Date of Patent: *Jul. 10, 2001

(54) RETENTION OF RADIO RESOURCE CONNECTION FOR SHORT MESSAGE SERVICE MESSAGE DELIVERY IN A CELLULAR TELEPHONE NETWORK

(75) Inventor: Thierry Josse, Stockholm (SE)

(73) Assignee: Telefonaktiebolaget LM Ericsson (publ) (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/974,264

(22) Filed: Nov. 19, 1997

(51) Int. Cl.[7] .................................................. H04Q 7/20
(52) U.S. Cl. ...................... 455/466; 455/411; 455/412; 455/435
(58) Field of Search ...................................... 455/412, 414, 455/433, 435, 445, 456, 466, 517, 554, 560, 410, 411

(56) References Cited

U.S. PATENT DOCUMENTS

| 5,289,179 |   | 2/1994  | Beeson et al. ............... 340/826 |
| 5,418,835 |   | 5/1995  | Frohman et al. ............. 379/57 |
| 5,428,665 | * | 6/1995  | Lantto ......................... 455/414 |
| 5,577,102 | * | 11/1996 | Koivunen ...................... 455/433 |
| 5,579,372 |   | 11/1996 | Åström . |
| 5,590,396 |   | 12/1996 | Henry ........................... 455/33.1 |
| 5,596,318 |   | 1/1997  | Mitchell ...................... 340/825.44 |
| 6,097,938 | * | 8/2000  | Paxson ......................... 455/410 |

FOREIGN PATENT DOCUMENTS

| 2 244 409   | 11/1991 | (GB) . |
| WO 94/16532 | 7/1994  | (WO) . |
| WO 96/38010 | 11/1996 | (WO) . |

OTHER PUBLICATIONS

European Standard Search Report dated Sep. 7, 1998 for RS 100338US.

* cited by examiner

*Primary Examiner*—Lester G. Kincaid
(74) *Attorney, Agent, or Firm*—Jenkens & Gilchrist (57) ABSTRACT

A radio resource connection in a successfully authenticated transaction is retained and utilized for other deliveries without requiring performance of paging or security related functions (such as authentication, assignment and ciphering). Responsive to a successfully authenticated transaction, a message is generated indicating that an addressee mobile station is available for attempted redelivery of a stored short message service message. In one implementation, the message is then retrieved and delivered to the mobile station over the retained radio resource connection. In another implementation, all other transactions are provided to the addressee mobile station over the retained radio resource connection, with the retrieved short message service message being subsequently delivered over the retained radio resource connection in a parallel transaction.

24 Claims, 4 Drawing Sheets

RETENTION OF RADIO RESOURCE CONNECTION FOR SHORT MESSAGE SERVICE MESSAGE DELIVERY IN A CELLULAR TELEPHONE NETWORK

BACKGROUND OF THE INVENTION

1. Technical Field of the Invention

The present invention relates to cellular telephone networks and, in particular, to cellular telephone networks supporting short message service message delivery.

2. Description of Related Art

Many cellular telephone networks support the transmission of short message service (SMS) messages to and from short message entities (SMEs) such as mobile stations. For example, such a short message service is currently supported by a number of digital cellular networks including the Personal Communications Services (PCS) network and the Global System for Mobile (GSM) communications network.

A short message service message delivery from a service center to a mobile station may fail for any one of a number of reasons. For example, the mobile station may not respond to a system page, and therefore not be reachable at the time of delivery. Similarly, short message service message delivery may fail because mobile station memory capacity has been exceeded and thus cannot currently handle the reception of another short message service message. The undelivered message is then stored in either case for later delivery. Subsequent to the failed message delivery attempt, radio contact with the mobile station may be established using a radio resource connection in a successfully authenticated transaction like a location update, call origination, call termination or call independent supplementary service. In connection therewith, a signal is sent to a home location register indicating that the mobile station is now available for message delivery. The radio resource connection used for the successfully authenticated transaction is then dropped. Responsive to the received signal, the home location register confirms that a message needs to be delivered to the mobile station, and signals the service center to effectuate delivery of the stored message. This delivery requires the use of a new radio resource connection with the mobile station.

SUMMARY OF THE INVENTION

It is recognized that in each of the foregoing exemplary scenarios, as well in connection with other scenarios involving failed short message service message delivery, a radio resource connection in a successfully authenticated transaction which is used to trigger an indication that the mobile station is now available for message delivery is dropped and a new radio resource connection in another successfully authenticated transaction is thereafter established to provide delivery of the stored short message service message. This presents a quite inefficient use of network communications resources.

The present invention advantageously retains the radio resource connection of a successfully authenticated transaction, and then utilizes that retained radio resource connection to provide delivery of the stored short message service message. To accomplish this end, a timer is started responsive to the indication that the mobile station is now available for message delivery. The radio resource connection of the first successfully authenticated transaction is then held in place until timer expiration. Meanwhile, stored message delivery occurs either in parallel with, or after the completion of, the successfully authenticated transaction. This procedure not only more efficiently utilizes connection resources, but also obviates the need to page for the mobile station and perform any necessary security related functions (such as authentication, assignment and ciphering) to provide stored short message service message delivery.

As a further extension of the present invention, the retained radio resource connection of the successfully authenticated transaction is utilized to support delivery of all other transactions (for example, location updating, call from, call to, mobile originated short message, mobile terminated short message, or call independent supplementary services) with respect to the mobile station. Once the transaction is provided, if the stored short message service message is delivered, it will also utilize the retained radio resource connection in a parallel transaction.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

Figure 1:
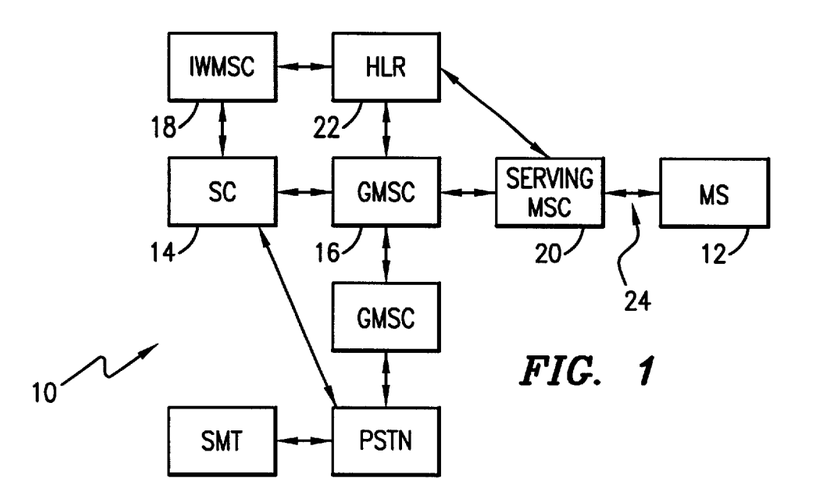
FIG. 1 is a block diagram of a cellular telephone network supporting short message service message handling and delivery.

Reference is now made to FIG. 1 wherein there is shown a block diagram of a cellular telephone network 10. The network 10 supports a short message service (SMS) for use by subscribers in conjunction with their conventional voice cellular telephone service. The purpose of the short message service is to provide a means for transferring textual messages between short message entities (SMEs) using the communications environment provided by the cellular telephone network 10. The short message entities participating in the short message service comprise short message terminals (SMTs) connected to the fixed telephone network (comprising a public switched telephone network (PSTN) or other equivalent telephone network). The short message entities further comprise the subscriber mobile stations (MS) 12 operating within the cellular telephone network 10.

A short message service center (SC) 14 is connected to a gateway mobile switching center (GMSC) 16 and to an inter-working mobile switching center (IWMSC) 18. It will, of course, be understood that the gateway mobile switching center 16 and inter-working mobile switching center 18 may comprise the same mobile switching center (MSC) in some instances. The short message service center 14 is further connected to the PSTN. The network 10 further includes another mobile switching center/visitor location register (MSC/VLR) 20 serving a subscriber mobile station 12 to which a short message service message may be delivered. Although only one mobile switching center/visitor location register 20 is illustrated, it will be understood that the network 10 includes many more mobile switching centers/visitor location registers. A home location register (HLR) 22 is connected to the mobile switching centers 16, 18 and 20.

The service center 14 functions as a store and forward center for receiving and delivering short message service messages between the short message entities. In those instances where delivery of a short message service message to a short message service entity fails, the message is stored in the service center 14, to be subsequently retrieved by or delivered to the addressee short message entity at a later time.

The gateway mobile switching center 16 functions to forward short message service messages addressed for mobile stations 12 from the service center 14. These messages are referred to as mobile terminated short messages (MT-SM). A different, mobile gateway mobile switching center serves as the connection port to the public switched telephone network (PSTN). The inter-working mobile switching center 18 functions to forward short message service messages originated at mobile stations 12 to the service center 14. These messages are referred to as mobile originated short messages (MO-SM). Again, it should be recognized that in some situations the gateway mobile switching center 16 and inter-working mobile switching center 18 may be implemented as a single network 10 node.

The home location register 22 stores data for subscribers having a subscription to the cellular telephone network 10. The stored subscriber data may comprise location information, directory number (MSISDN), radio numbering plan identification comprising an international mobile subscriber identity (IMSI), call independent supplementary service profiles, teleservice profiles, and the like. The visitor location register (VLR) portion of the mobile switching center/visitor location register 20 stores data for subscribers owning mobile stations 12 that are currently roaming in network 10. This data comprises substantially the same data as is stored in the home location register 22. The data is typically transferred to the visitor location register portion from the home location register when the mobile station makes a registration. The mobile switching center (MSC) portion of the mobile switching center/visitor location register 20 performs call switching and transaction control with respect to served mobile stations 12 using the data stored in the visitor location register portion and the home location register.

The mobile switching center/visitor location register 20 communicates with the served mobile stations 12 over an air interface 24 (defined, for example, in accordance with the Global System for Mobile (GSM) communications, Interim Standard IS-95, Interim Standard IS-136, or the like, communications protocols). A radio network utilizing a plurality of base stations (not shown), and perhaps also base station controllers (not shown), supports communication over the air interface 24. This communication is carried utilizing a radio resource (RR) connection allocated by the mobile switching center/visitor location register 20, and is provided in accordance with connection management (CM) and mobility management (MM) resources in a manner known to those skilled in the art.

Figure 2:
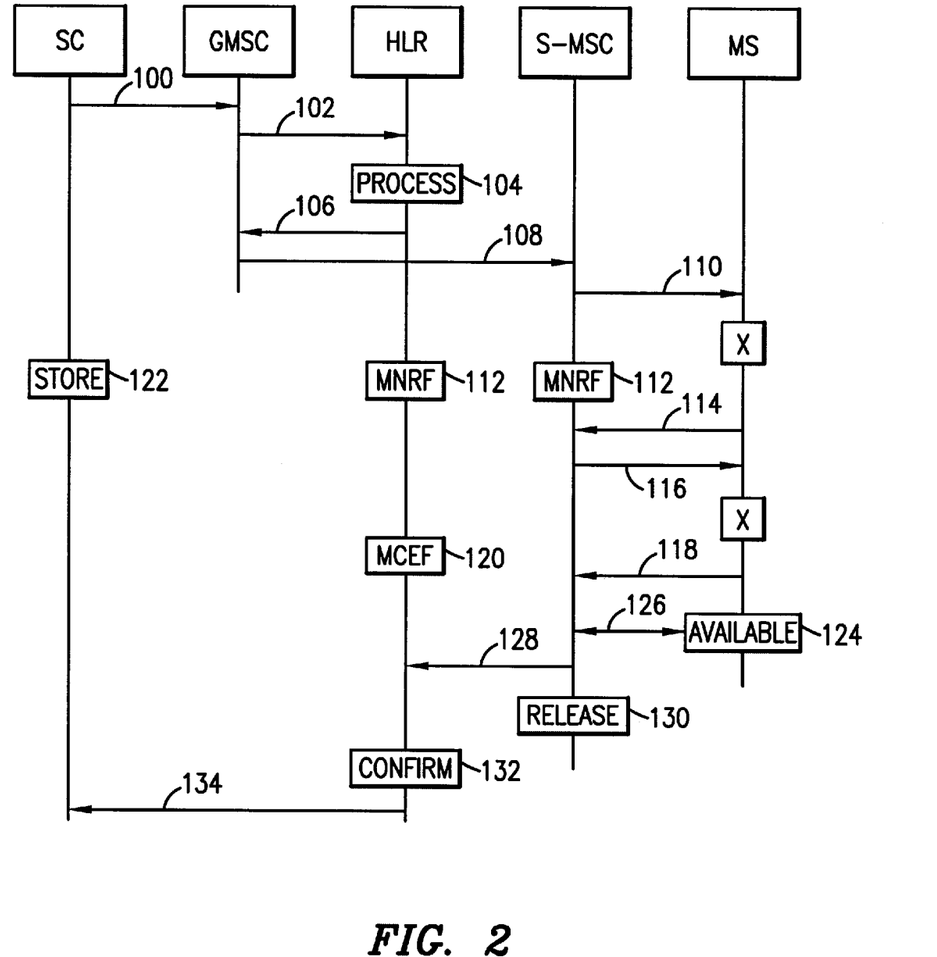
FIG. 2 is a message flow and nodal operation diagram illustration operation of the network of FIG. 1 in connection with the prior art delivery of a mobile terminated short message.

Reference is now made to FIG. 2 wherein there is shown a message flow and nodal operation diagram illustration operation of the network 10 of FIG. 1 in connection with the prior art delivery of a mobile terminated short message (MT-SM). The service center 14 sends a mobile terminated short message 100 to the gateway mobile switching center 16. The addressee mobile station 12 for the message 100 is identified by an included MSISDN number. The gateway mobile switching center 16 then queries 102 the home location register 24 for information needed to route the message 100 to the addressee mobile station 12. By processing (action 104) the MSISDN number in the home location register 24, an identification of the serving mobile switching center 20 is found. Appropriate routing information 106 is then sent back to the gateway mobile switching center 16. The received mobile terminated short message 100 is then forwarded 108 to the serving mobile switching center 20. The addressee mobile station 12 is then polled for 110 by the serving mobile switching center 20 over the air interface.

If no poll response is received (as indicated by the "X"), a mobile not reachable flag (MNRF) is set (actions 112) in both the visitor location register (VLR) portion of the serving mobile switching center 20 and the home location register 24. If a poll response 114 is received, the serving mobile switching center 20 attempts delivery 116 of the forwarded 108 mobile terminated short message 100. This delivery 116 may fail (as indicated by "X") if the memory capacity of the addressee mobile station 12 has been exceeded. A delivery failure message 118 is then returned to the serving mobile switching center 20. A memory capacity exceeded flag (MCEF) is then set (actions 120) in the home location register 24. In each case, the service center 14 has stored (action 122) the mobile terminated short message 100 for later delivery.

Following failed delivery, the addressee mobile station 12 may subsequently become available (action 124). With respect to the failed delivery caused by the mobile station not being reachable (i.e., the mobile not reachable flag (MNRF) was set), availability 124 may result from the allocation of a radio resource connection 126 in a successfully authenticated transaction like a location update, call origination, call termination, short message origination, short message termination, or call independent supplementary service. With respect to the failed delivery caused by the mobile station not having sufficient memory (i.e., the memory capacity exceeded flag (MCEF) was set), availability 124 may result from a clearing of a portion of the memory along with the allocation of a radio resource connection 126 in a successfully authenticated transaction to send a mobile originated short message (MO-SM) to the serving mobile switching center 20 indicating that short message memory is now available. In the first case, the serving mobile switching center 20 checks that the MNRF flag is set, and if so sends a message 128 to the home location register 24 indicating that the mobile station is ready for a short message delivery. In the second case, the serving mobile switching center 20 sends a message 128 to the home location register 24 indicating that the mobile station is ready for a short message delivery. The serving mobile switching center 20 further releases 130 the radio resource connection 126, as well as the associated connection management (CM) and mobility management (MM) resources, for the air interface connection with the addressee mobile station 12. The home location register then confirms (action 132) that either the MNRF or MCEF flag is set, and sends a message 134 to the service center 14 requesting stored short message delivery. The procedure then returns to sending the mobile terminated short message 100 to the gateway mobile switching center 16.

The eventual delivery 116 of the short message 100 unfortunately requires the allocation of a new radio resource connection 126 (along with associated connection management (CM) and mobility management (MM) resources) for the air interface connection with the addressee mobile station 12. The present invention addresses this inefficient use of valuable network communications resources.

Figure 3:
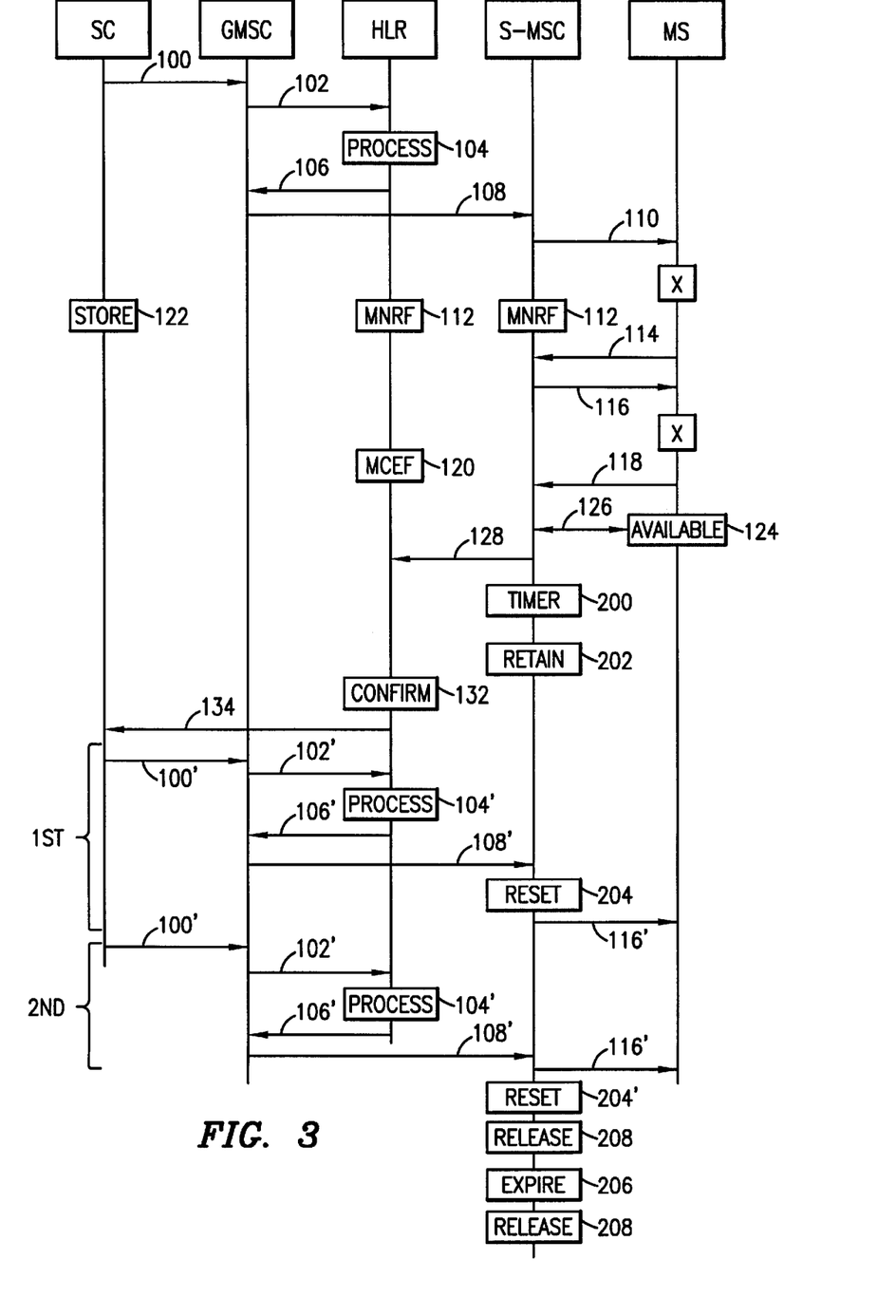
FIG. 3 is a message flow and nodal operation diagram illustration operation of the network of FIG. 1 in connection with the present invention delivery of a mobile terminated short message.

Reference is now made to FIG. 3 wherein there is shown a message flow and nodal operation diagram illustration operation of the network 10 of FIG. 1 in connection with the present invention delivery of a mobile terminated short message (MT-SM). The service center 14 sends a mobile terminated short message 100 to the gateway mobile switching center 16. The addressee mobile station 12 for the message 100 is identified by an included MSISDN number. The gateway mobile switching center 16 then queries 102 the home location register 24 for information needed to route the message 100 to the addressee mobile station 12. By processing (action 104) the MSISDN number in the home location register 24, an identification of the serving mobile switching center 20 is found. Appropriate routing information 106 is returned back to the gateway mobile switching center 16. The received mobile terminated short message 100 is then forwarded 108 to the serving mobile switching center 20. The addressee mobile station 12 is then polled for 110 over the air interface.

If no poll response is received (as indicated by the "X"), a mobile not reachable flag (MNRF) is set (actions 112) in the visitor location register (VLR) portion of the serving mobile switching center 20 and the home location register 24. If a poll response 114 is received, the serving mobile switching center 20 attempts delivery 116 of the forwarded 108 mobile terminated short message 100. This delivery 116 may fail (as indicated by "X") if the memory capacity of the addressee mobile station 12 has been exceeded. A delivery failure message 118 is then returned to the serving mobile switching center 20. A memory capacity exceeded flag (MCEF) is then set (actions 120) in the home location register 24. In each case, the service center 14 has stored (action 122) the mobile terminated short message 100 for later delivery.

Following failed delivery, the addressee mobile station 12 may subsequently become available (action 124). With respect to the failed delivery caused by the mobile station not being reachable (i.e., the mobile not reachable flag (MNRF) was set), availability 124 may result from the allocation of a radio resource connection 126 in a successfully authenticated transaction like a location update, call origination, call termination, short message origination, short message termination, or call independent supplementary service. With respect to the failed delivery caused by the mobile station not having sufficient memory (i.e., the memory capacity exceeded flag (MCEF) was set in the home location register), availability 124 may result from a clearing of a portion of the memory along with the allocation of a radio resource connection 126 in a successfully authenticated transaction to send a mobile originated short message (MO-SM) to the serving mobile switching center 20 indicating that short message memory is now available. In the first case, the serving mobile switching center 20 checks that the MNRF flag is set, and if so sends a message 128 to the home location register 24 indicating that the mobile station is ready for a short message delivery. In the second case, the serving mobile switching center 20 sends a message 128 to the home location register 24 indicating that the mobile station is ready for a short message delivery. At the same point, the serving mobile switching center 20 starts a timer (action 200) and retains 202 the radio resource connection 124. The serving mobile switching center 20 then waits for delivery of the stored 122 the mobile terminated short message 100.

Responsive to the message 126, the home location register 24 confirms (action 132) that either the MNRF or MCEF flag is set, and sends a message 134 to the service center 14 requesting stored short message delivery. Two short message delivery scenarios now arise. In a first scenario, the transaction which enabled the addressee mobile station to be reachable (i.e., the allocation of a radio resource connection 126 in a successfully authenticated transaction as described above) is still ongoing when the service center 14 re-sends the mobile terminated short message 100' and it is forwarded 108' to the serving mobile switching center 20. In this case, the associated connection management (CM) and mobility management (MM) resources for the original transaction are also retained. The timer is then reset (action 204), and the serving mobile switching center 20 provides delivery 116' of the forwarded 108' mobile terminated short message 100' as a parallel transaction using the retained 202 radio resource connection 126.

In a second scenario, the transaction which enabled the addressee mobile station to be reachable (i.e., the allocation of a radio resource connection 126 in a successfully authenticated transaction as described above) ends before the service center 14 resent mobile terminated short message 100' is forwarded 108' to the serving mobile switching center 20. In this case, the associated connection management (CM) and mobility management (MM) resources for the original transaction are released. The forwarded 108' mobile terminated short message 100' is then delivered 116' using the retained 202 radio resource connection 126 and new connection management and mobility management resources. Retention of the radio resource connection 126 occurs until either the serving mobile switching center 20 provides delivery 116' or the timer expires, whichever occurs first. If the delivery 116' occurs before the timer expires, the timer is reset (action 204') and the retained 202 radio resource connection 126 is released (action 208). If the timer expires (action 206), the retained 202 radio resource connection 126 is also released (action 208).

Figure 4:
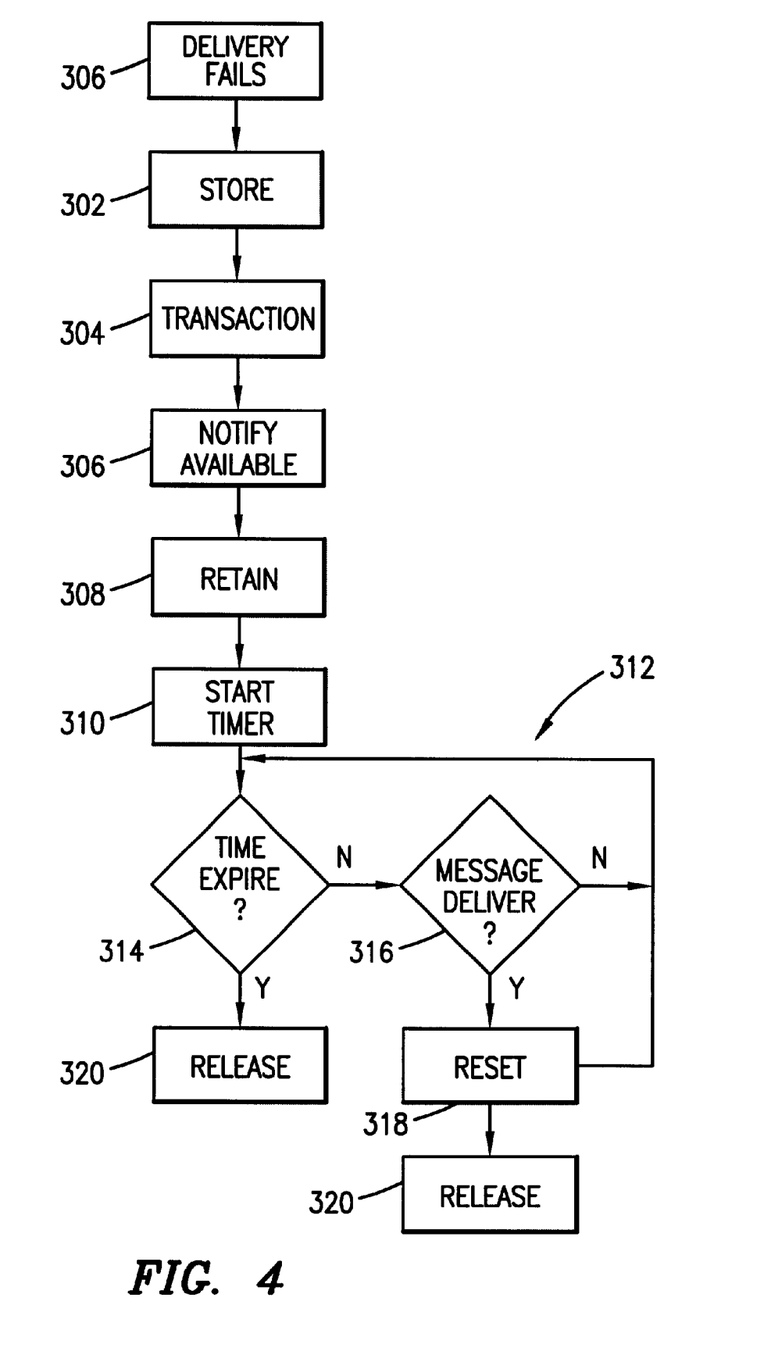
FIG. 4 is a flow diagram illustrating network operation in accordance with the present invention.

Reference is now made to FIG. 4 wherein there is shown a flow diagram illustrating network operation in accordance with the present invention. In step 300, a short message service message delivery attempt to an addressee mobile station fails. The message is stored in step 302 for subsequent delivery. Thereafter, in step 304, a transaction occurs with respect to the mobile station. This transaction requires the establishment of a radio resource connection and the performance of security related functions (such as authentication, assignment and ciphering). Responsive to the transaction of step 304, notification is given in step 306 that the addressee mobile station is now available for attempted delivery of the stored short message service message. The radio resource connection of the step 304 transaction is retained in step 308, even if the transaction itself terminates, and a timer is started in step 310. The process then loops 312 waiting for either the timer to expire (decision step 314) or the short message service message be delivered (decision step 316). If delivery of the short message service message over the retained radio resource connection is provided (as determined in step 316), the timer is reset in step 318, and the retained radio resource connection in step 320, and the process ends. If the timer expires (as determined in step 314) the retained radio resource connection is also released in step 320, and the process ends.

Figure 5:
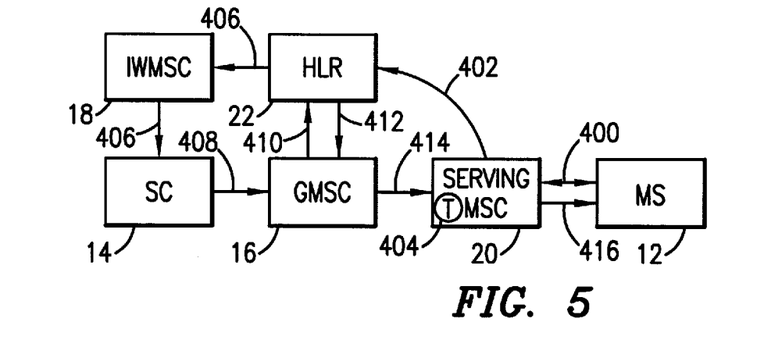
FIG. 5 is a block diagram of the network of FIG. 1 illustrating functional operations performed in accordance with the present invention.

Reference is now made to FIG. 5 wherein there is shown a block diagram of the network of FIG. 1 illustrating functional operations performed in accordance with the present invention. It is assumed here that a delivery of a short message service message to an addressee mobile station 12 has already failed. Subsequent thereto, radio contact 400 (using a radio resource connection) is established with the addressee mobile station 12. This contact 400 may occur in connection with a successfully authenticated transaction like a location update, call origination, call termination, short message origination, short message termination, or call independent supplementary service. Alternatively, this contact 400 may occur in connection with a successfully authenticated transaction to send a mobile originated short message (MO-SM) indicating that short message memory is now available. In either case the contact is interpreted as an indication that the addressee mobile station is now available for an attempted re-delivery of the previously failed short message service message delivery.

A serving mobile switching center 20 then notifies 402 a home location register 24 that the addressee mobile station 12 is now available for short message service message delivery. The radio resource connection for the successfully authenticated transaction is retained and a timer is started 404. The radio resource connection is retained until such time as the timer expires. The home location register 24 then alerts the service center 14 of mobile station availability by sending a message 406 through an inter-working mobile switching center 18. Responsive to the alert, the service center retrieves and sends 408 the short message service message to a gateway mobile switching center 16. The home location register 24 is then queried 410 by the gateway mobile switching center 16 for location information. The location information is returned 412 back to the gateway mobile switching center 16 identifying the serving mobile switching center 20. The sent 408 short message service message is then forwarded 414 to the serving mobile switching center 20. Using the retained radio resource connection of the radio contact 400 transaction, the serving mobile switching center 20 delivers 416 short message service message to the addressee mobile station 12. No paging for or authentication of the mobile station 12 need occur in making this delivery 416.

Figure 6:
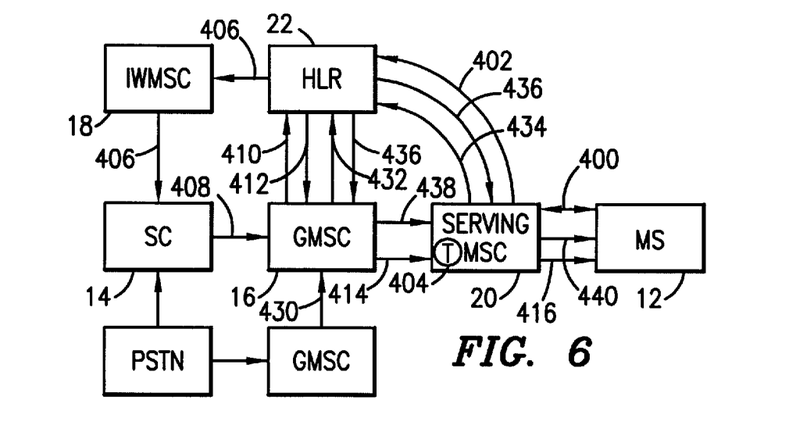
FIG. 6 is a block diagram of the network of FIG. 1 illustrating functional operations performed in accordance with an alternative implementation of the present invention.

Reference is now made to FIG. 6 wherein there is shown a block diagram of the network of FIG. 1 illustrating functional operations performed in accordance with an alternative implementation of the present invention. It is again assumed here that a delivery of a short message service message to an addressee mobile station 12 has already failed. Subsequent thereto, radio contact 400 (using a radio resource connection in a successfully authenticated transaction) is established with the addressee mobile station 12. This contact is interpreted as an indication that the addressee mobile station is now available for an attempted re-delivery of the previously failed short message service message delivery.

A serving mobile switching center 20 then notifies 402 a home location register 24 that the addressee mobile station 12 is now available for short message service message delivery. The radio resource connection for the successfully authenticated transaction is retained and a timer is started 404. The radio resource connection is retained until such time as the timer expires. The home location register 24 then alerts the service center 14 of mobile station availability by sending a message 406 through an inter-working mobile switching center 18.

In the meantime, another transaction (for example, a location update, a call from/to the mobile station, a mobile originated/terminated short message, or call independent supplementary service) is provided to the mobile station. In the following specific illustrative example, an incoming call to the mobile station is considered. An incoming call 430 dialed toward the addressee mobile station is received at a gateway mobile switching center 16. The home location register 24 is then queried 432 by the gateway mobile switching center 16 for location information. The identified serving mobile switching center 20 is then queried 434 for a routing/roaming number. The routing/roaming number is then returned 436 through the home location register 24 to the gateway mobile switching center 16. The incoming call 430 is then setup 438 to the serving mobile switching center 20. Using the retained radio resource connection of the radio contact 400 transaction, the serving mobile switching center 20 delivers 440 the incoming call 430 to the mobile station 12. No paging for or authentication of the mobile station 12 need occur in making this delivery 440.

Responsive to the alert of message 406 sent by the home location register, the service center retrieves and sends 408 the short message service message to the gateway mobile switching center 16. The home location register 24 is then queried 410 by the gateway mobile switching center 16 for location information. The location information is returned 412 back to the gateway mobile switching center 16 identifying the serving mobile switching center 20. The sent 408 short message service message is then forwarded 414 to the serving mobile switching center 20. Using the retained radio resource connection of the radio contact 400 transaction, the serving mobile switching center 20 delivers 416 the short message service message to the addressee mobile station 12 in a parallel transaction with the delivered 440 incoming call 430. Again, no paging for or authentication of the mobile station 12 need occur in making this delivery 416.

In order to ensure proper operation of the system, the set value of the timer must be carefully chosen. In accordance with current GSM standards, for example, the mobile station starts its own timer (T3240) when mobility management (MM) resources are released. When this mobile station timer expires, the mobile station releases the radio resource connection. Accordingly, the value set in the timer maintained in the serving mobile switching center must be less than the value set in the timer of the mobile station. With respect to GSM, a timer value of less than ten seconds may be chosen for the mobile switching center timer.

Although an embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A mobile telephone system, comprising:

a service center for storing undelivered short messages addressed to mobile stations and for sending those stored short messages to mobile stations; and a mobile switching center operating to:

detect availability of an addressee mobile station to receive a stored short message, said availability detected as a result of the establishment of a radio resource connection with the addressee mobile station and the use of that established radio resource connection to engage in a successfully authenticated transaction with the addressee mobile station comprising an incoming/outgoing addressee mobile station telephone call over that radio resource connection;

retain the radio resource connection of the successfully authenticated transaction following completion of that transaction; and deliver the stored short message sent from the service center to the addressee mobile station over the retained radio resource connection.

2. The mobile telephone system as in claim 1 wherein the successfully authenticated transaction is ongoing at the time of short message delivery to the addressee mobile station, and the mobile switching center delivers the stored short message sent from the service center to the addressee mobile station over the retained radio resource connection in a parallel transaction.

3. The mobile telephone system as in claim 1 wherein the mobile switching center further includes a timer for timing a time period during which the radio resource connection of the successfully authenticated transaction is retained to permit delivery of the short message or another transaction to the addressee mobile station.

4. A mobile telephone system, comprising:
a service center for storing undelivered short messages addressed to mobile stations and for sending those stored short messages to mobile stations; and
a mobile switching center operating to:
detect availability of an addressee mobile station to receive a stored short message, said availability detected as a result of the establishment of a radio resource connection with the addressee mobile station and the use of that established radio resource connection to engage in a successfully authenticated transaction with the addressee mobile station comprising a registration with the mobile telephone system by the addressee mobile station over that radio resource connection;
retain the radio resource connection of the successfully authenticated transaction following completion of that transaction; and
deliver the stored short message sent from the service center to the addressee mobile station over the retained radio resource connection.

5. A mobile telephone system, comprising:
a service center for storing undelivered short messages addressed to mobile stations and for sending those stored short messages to mobile stations; and
a mobile switching center operating to:
detect availability of an addressee mobile station to receive a stored short message, said availability detected as a result of the establishment of a radio resource connection with the addressee mobile station and the use of that established radio resource connection to engage in a successfully authenticated transaction with the addressee mobile station comprising a call independent supplementary service provided to the addressee mobile station over that radio resource connection;
retain the radio resource connection of the successfully authenticated transaction following completion of that transaction; and
deliver the stored short message sent from the service center to the addressee mobile station over the retained radio resource connection.

6. A mobile telephone system, comprising:
a mobile switching center operating to:
establish a radio resource connection with a certain mobile station and use that established radio resource connection to engage in a successfully authenticated transaction with the certain mobile station other than a short message service origination or termination over that radio resource connection;
retain the radio resource connection of the successfully authenticated transaction following completion of that transaction; and
subsequently deliver an incoming telephone call to the certain mobile station over the retained radio resource connection.

7. The mobile telephone system as in claim 6 wherein the successfully authenticated transaction comprises a registration with the mobile telephone system by the certain mobile station.

8. The mobile telephone system as in claim 6 wherein the successfully authenticated transaction comprises a call independent supplementary service provided to the certain mobile station.

9. The mobile telephone system as in claim 6 wherein the mobile switching center further includes a timer for timing a time period during which the radio resource connection of the successfully authenticated transaction is retained to permit delivery of the incoming telephone call to the certain mobile station.

10. The mobile telephone system as in claim 6 further including:
a service center for storing undelivered short messages addressed to mobile stations and for sending those stored short messages to mobile stations; and
wherein the mobile switching center further operating to:
detect availability of the certain mobile station to receive a stored short message, said availability detected as a result of the establishment of the radio resource connection with a certain mobile station and use that established radio resource connection to engage in the successfully authenticated transaction other than a short message service origination or termination; and
deliver the stored short message sent from the service center to the certain mobile station over the retained radio resource connection.

11. The mobile telephone system as in claim 10 wherein the delivered telephone call is ongoing at the time of short message delivery to the addressee mobile station, and the mobile switching center delivers the stored short message sent from the service center to the certain mobile station over the retained radio resource connection in a parallel transaction.

12. The mobile telephone system as in claim 10 wherein the mobile switching center further includes a timer for timing a time period during which the radio resource connection of the successfully authenticated transaction is retained to permit delivery of the short message or another transaction to the certain mobile station.

13. A method, comprising the steps of:
storing undelivered short messages addressed to mobile stations;
detecting availability of an addressee mobile station to receive a stored short message, said availability detected as a result of the establishment of radio resource connection with the addressee mobile station and use that established radio resource connection to engage in a successfully authenticated transaction with the addressee mobile station comprising an incoming/outgoing addressee mobile station telephone call using that radio resource connection;

retaining the radio resource connection of the successfully authenticated transaction following completion of that transaction;

sending the stored short message to the address8ee mobile station; and delivering the stored short message sent to the addressee mobile station over the retained radio resource connection.

14. The method as in claim 13 wherein the successfully authenticated transaction is ongoing at the time of short message delivery to the addressee mobile station, and the step of delivering comprises the step of delivering the stored short message sent to the addressee mobile station over the retained radio resource connection in a parallel transaction.

15. The method as in claim 13 further including the step of timing a time period during which the radio resource connection of the successfully authenticated transaction is retained to permit delivery of the short message or another transaction to the addressee mobile station.

16. A method, comprising the steps of:

storing undelivered short messages addressed to mobile stations;

detecting availability of an addressee mobile station to receive a stored short message, said availability detected as a result of the establishment of radio resource connection with the addressee mobile station and use that established radio resource connection to engage in a successfully authenticated transaction with the addressee mobile station comprising a system registration by the addressee mobile station using that radio resource connection;

retaining the radio resource connection of the successfully authenticated transaction following completion of that transaction;

sending the stored short message to the addressee mobile station; and delivering the stored short message sent to the addressee mobile station over the retained radio resource connection.

17. A method, comprising the steps of:

storing undelivered short messages addressed to mobile stations;

detecting availability of an addressee mobile station to receive a stored short message, said availability detected as a result of the establishment of radio resource connection with the addressee mobile station and use that established radio resource connection to engage in a successfully authenticated transaction with the addressee mobile station comprising a call independent supplementary service provided to the addressee mobile station using that radio resource connection;

retaining the radio resource connection of the successfully authenticated transaction following completion of that transaction;

sending the stored short message to the addressee mobile station; and delivering the stored short message sent to the addressee mobile station over the retained radio resource connection.

18. A method comprising the steps of:

establishing a radio resource connection with a certain mobile station and using that established radio resource connection to engage in a successfully authenticated transaction with the certain mobile station other than a short message service origination or termination over that radio resource connection;

retaining the radio resource connection of the successfully authenticated transaction following completion of that transaction; and subsequently delivering an incoming telephone call to the certain mobile station over the retained radio resource connection.

19. The method as in claim 18 wherein the successfully authenticated transaction comprises a system registration by the certain mobile station.

20. The method as in claim 18 wherein the successfully authenticated transaction comprises a call originated supplementary service provided to the certain mobile station.

21. The method as in claim 18 further including the step of timing a time period during which the radio resource connection of the successfully authenticated transaction is retained to permit delivery of the incoming telephone call to the certain mobile station.

22. The method as in claim 18 further including the steps of:

storing undelivered short messages addressed to mobile stations;

detecting availability of the certain mobile station to receive a stored short message, said availability detected as a result of the establishment of the radio resource connection with the certain mobile station and use that established radio resource connection to engage in the successfully authenticated transaction other than a short message service origination or termination;

sending the stored short message to the certain mobile station; and delivering the sent short message to the certain mobile station over the retained radio resource connection.

23. The method as in claim 22 wherein the delivered telephone call is ongoing at the time of short message delivery to the certain mobile station, and the step of delivering comprises the step of delivering the sent short message to the certain mobile station over the retained radio resource connection in a parallel transaction.

24. The method as in claim 22 further including the step of timing a time period during which the radio resource connection of the successfully authenticated transaction is retained to permit delivery of the short message or another transaction to the certain mobile station.

* * * * *